No. 626,984. Patented June 13, 1899.
M. DÉRI.
COMBINED ALTERNATING CONTINUOUS CURRENT SYSTEM FOR ELECTRIC TRACTION.
(Application filed Apr. 27, 1897.)
(No Model.)
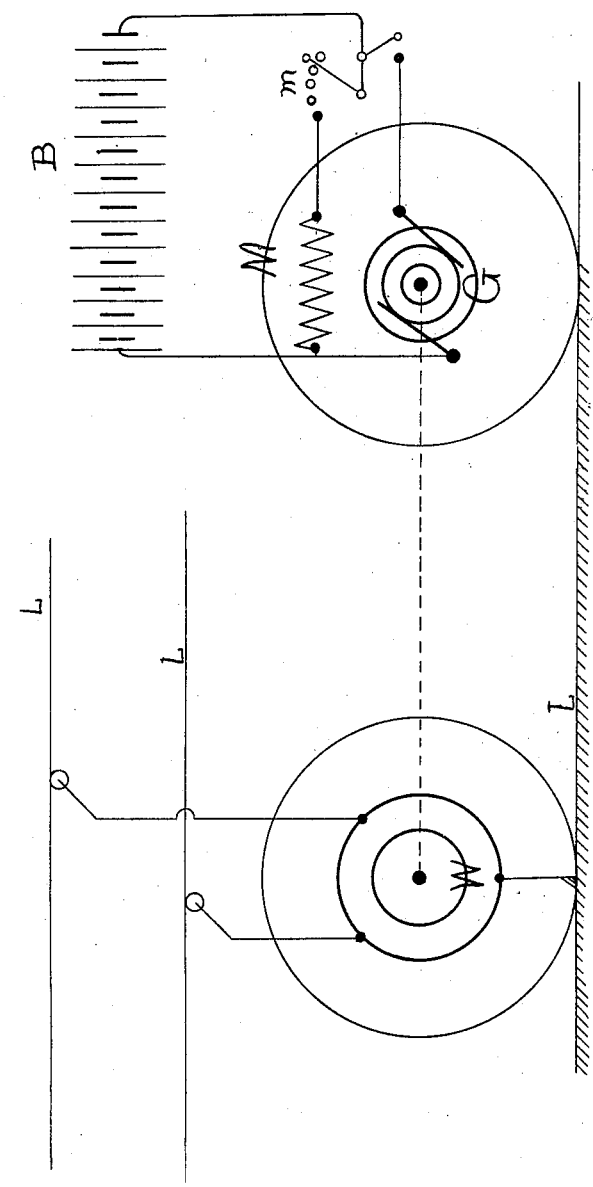
WITNESSES:
F. W. Wright
S. C. Connor
INVENTOR
Max Déri
BY
Howson and Howson
ATTORNEYS.

UNITED STATES PATENT OFFICE.

MAX DÉRI, OF VIENNA, AUSTRIA-HUNGARY.

COMBINED ALTERNATING CONTINUOUS CURRENT SYSTEM FOR ELECTRIC TRACTION.

SPECIFICATION forming part of Letters Patent No. 626,984, dated June 13, 1899.

Application filed April 27, 1897. Serial No. 634,120. (No model.)

*To all whom it may concern:*

Be it known that I, MAX DÉRI, a subject of the Emperor of Austria-Hungary, and a resident of Vienna, in the Province of Lower Austria, Austria-Hungary, have invented Improvements in a Combined Alternating Continuous Current System for Electric Traction, of which the following is a specification.

The advantages of employing alternating currents, more particularly multiphase alternating currents, for transmission of power are well understood, but in the construction of electric-railway systems it has not as yet been found practicable to employ alternating currents successfully. This is mainly because alternating-current motors, although more solid in construction and in many respects more advantageous than continuous-current motors, do not work as well on electric railways, because of the great variations of speed required and also because of the difficulties in starting alternating-current motors and of utilizing alternating currents in connection with accumulators.

With the view of utilizing alternating currents to some extent for electric railways it has been repeatedly proposed to construct such railways with transforming-stations to convert the alternating current into continuous current; but such transforming appliances are expensive, involve considerable loss of energy, require special care, and are in many respects uneconomical. My present invention does away with these difficulties and permits of the utilization without employing transforming-stations of single-phase or multiphase alternating currents with accumulators and the employment at the same time to the best advantage of alternating-current motors and continuous-current motors. In my system the greater part of the work for the production of power is obtained from the alternating currents directly, and but a small part—the work of the accumulator—is obtained through transformation.

An arrangement for carrying my invention into effect is diagrammatically illustrated in the view of the accompanying drawing, in which I have illustrated my invention as applied to an electric-railway system employing multiphase alternating currents.

In the diagram, L L L represent or indicate the line conductors, and W represents an alternating-current motor on a car supplied with multiphase alternating currents from the said line conductors.

G represents or indicates a direct-current motor or dynamo-electric machine connected up with an accumulator-battery B to be carried on the car or train.

M indicates the field-magnet coils of the continuous-current motor or dynamo-electric machine, shown as connected up in shunt and provided with any suitable hand-controlled or automatic regulating means, (indicated at *m*.)

The alternating-current motor and the dynamo-electric machine are upon the same car or upon the same train and they may be mounted upon the same axle. If they are mounted on different axles, they are, nevertheless, in effect so connected with each other through the wheels of the car or cars running upon the same tracks that the two machines run in unison. I prefer to mechanically connect up the two motors to different axles or wheels of the same train or the same car, as illustrated in the drawing.

According to my system there are conducted single-phase or multiphase alternating currents to the line conductors, either directly or through transformers. These line conductors may be either overhead, underground, or on the surface. It is not important to have the line conductors constructed without interruption. On the contrary, in places where the construction of conduits, for instance, would meet with difficulties or be an inconvenience, as at crossings, switches, &c., the lines can be interrupted.

When the alternating-current motor on the car is in electrical connection with the line conductors, such current or currents will furnish the power to run the car or train. During this time the dynamo-electric machine being driven charges the accumulator with a continuous current, and thus there is provided a sort of transforming device. The accumulators act as a so-called "booster-battery" to equalize the motive power. If, for instance, in running on a downgrade the energy of the alternating current is more than sufficient to move the car or train, the continuous dynamo will serve to charge the accumulators, whereas if on an upgrade the alternating-current motor does not supply sufficient power to move the car or train at the desired speed the battery can supply current to the dynamo, which is thereby converted into a continuous-current motor to aid the work of the alternating-current motor.

In stretches where the line conductors are interrupted the accumulator alone can supply the energy needed for motive power. In the same way and for the same reason it is not necessary to use the energy of the alternating current in starting. This is of importance, because it is well known that single-phase alternating-current motors cannot be started under load, but after attaining a certain speed they work very well.

Under ordinary conditions of electric-railway work the well-known advantages of a shunt-motor cannot be availed of, because machines of the size usually employed cannot be well be shunt-wound for a pressure of five hundred volts. By my invention, however, the advantage of the shunt-winding can be availed of, because the electromotive force of the battery can be made comparatively low, (one hundred to two hundred volts.) The combination of the shunt-motor and battery, moreover, make an excellent braking arrangement, as it enables a large part of the kinetic energy of the moving train to be recovered in stopping and also enables me to get an exceptionally high torque for starting, &c.

Where in the following claims I use the word "motor" and "dynamo" in the singular I do not intend to be understood as excluding thereby the use of more than one such motor or dynamo.

I claim as my invention—

1. In an electric-railway system, the combination of a car or train carrying an alternating-current motor to operate the car or train and a continuous-current dynamo or motor also connected mechanically to an axle or wheel of the train or car, with an accumulator-battery carried by the train or car and electrically connected up to the direct-current dynamo or motor, and line conductors supplying alternating currents to the alternating-current motor, substantially as described.

2. In an electric-railway system, the combination of a car or train carrying an alternating-current motor to operate the car or train and a shunt-wound continuous-current dynamo or motor also connected mechanically to an axle or wheel of the train or car, with an accumulator-battery carried by the train or car and electrically connected up to the direct-current dynamo or motor, and line conductors supplying alternating currents to the alternating-current motor, substantially as described.

3. In an electric-railway system, the combination of a car or train having an alternating-current motor mechanically connected up to an axle of the car or train to operate the same and a continuous-current dynamo or motor mechanically connected up to another axle of the car or train, with an accumulator-battery carried by the train or car and electrically connected up to the direct-current dynamo or motor, and line conductors supplying alternating currents to the alternating-current motor, substantially as described.

4. In an electric-railway system, the combination of a car or train carrying an alternating-current motor to operate the car or train and a continuous-current dynamo or motor also connected mechanically to an axle or wheel of the car or train, with an accumulator-battery carried by the car or train and electrically connected up to the direct-current dynamo or motor, and interrupted line conductors supplying alternating currents to the alternating-current motor, substantially as described.

In testimony whereof I have signed my name to this specification in the presence of two subscribing witnesses.

MAX DÉRI.

Witnesses:
HARRY BELMONT,
KARL HÜTTER.